(12) United States Patent
Gilbert

(10) Patent No.: US 7,197,123 B1
(45) Date of Patent: Mar. 27, 2007

(54) SYSTEM AND METHOD FOR PRESENTING CALLER IDENTIFICATION LOGS

(75) Inventor: Quenton Lanier Gilbert, Atlanta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 10/860,042

(22) Filed: Jun. 3, 2004

Related U.S. Application Data (63) Continuation-in-part of application No. 10/316,729, filed on Dec. 11, 2002, now abandoned.

(51) Int. Cl.
*H04M 1/56* (2006.01)
*H04M 3/42* (2006.01)

(52) U.S. Cl. .................. 379/142.01; 379/142.06; 379/142.15; 379/211.01; 455/415

(58) Field of Classification Search ........... 379/142.01, 379/142.04, 142.05, 142.12, 142.13, 142.15, 379/142.18, 88.19, 88.2, 88.21, 211.01, 213.01, 379/214.01; 455/415
See application file for complete search history.

(56) References Cited

U.S. PATENT DOCUMENTS

| | | | | |
|---|---|---|---|---|
| 5,764,731 A | * | 6/1998 | Yablon | 379/88.15 |
| 5,999,611 A | * | 12/1999 | Tatchell et al. | 379/211.02 |
| 6,049,713 A | * | 4/2000 | Tran et al. | 455/415 |
| 6,282,275 B1 | * | 8/2001 | Gurbani et al. | 379/142.06 |
| 6,389,125 B1 | * | 5/2002 | Ubowski | 379/142.12 |
| 6,438,216 B1 | * | 8/2002 | Aktas | 379/88.01 |
| 6,442,264 B1 | * | 8/2002 | Sutter | 379/142.07 |
| 6,477,546 B1 | * | 11/2002 | Velamuri et al. | 707/202 |
| 6,493,429 B1 | * | 12/2002 | Cannon et al. | 379/88.01 |
| 6,574,318 B1 | * | 6/2003 | Cannon et al. | 379/142.01 |
| 6,928,154 B1 | * | 8/2005 | Cheaito et al. | 379/207.15 |
| 7,031,437 B1 | * | 4/2006 | Parsons et al. | 379/88.12 |
| 2003/0198323 A1 | * | 10/2003 | Watanabe | 379/88.21 |
| 2004/0248560 A1 | * | 12/2004 | Bedingfield et al. | 455/412.2 |

* cited by examiner

*Primary Examiner*—Quoc Tran
(74) *Attorney, Agent, or Firm*—Parks Knowlton LLC; J. Perry Herndon, Esq.; Robert Evora (57) ABSTRACT

Call identification information regarding calls placed to or from a wireless device that subscribes to a Call Log service is recorded and stored in network-based incoming and outgoing call information logs, preferably at a Service Node. The network is prompted to capture call identification information by triggers provisioned on the subscribing line, wherein the triggers identify the subscribing directory number as a subscriber to the Call Log service. The call information logs can be retrieved by any requesting communication device that sends a presentation request and can be authenticated at the network via provision of an authentication code, or via referencing number in a network-based database permissions associated with the requesting communication device's directory.

20 Claims, 6 Drawing Sheets

SYSTEM AND METHOD FOR PRESENTING CALLER IDENTIFICATION LOGS

CROSS-REFERENCE TO RELATED APPLICATION

This is a continuation-in-part of application Ser. No. 10/316,729, filed Dec. 11, 2002 now abandoned, the entirety of which is incorporated herein.

FIELD OF THE INVENTION

The present invention generally relates to the field of telecommunications, and particularly relates to a system and method for providing a user remote access to caller identification logs for a first number while the user is at a second number.

BACKGROUND OF THE INVENTION

Caller identification, a feature that allows a user to view the information identifying incoming callers, has become an incredibly popular telecommunications feature. Caller identification services are generally available from most local telephone companies. Through the use of a communication device equipped for caller identification (either integrated or through an adjunct unit), the service allows users to see the identity of the calling party before answering a call. The information for each incoming call, typically the name and number of the calling party, is stored in a call log that is locally associated with the communication device.

This service adds tremendous utility for many users, because a user may view callers who have called the user's directory number, hereinafter referred to as the "first" number, by scrolling through the caller identification log for the first number. This task is typically accomplished via a caller identification display on a communication device coupled to a first number or a dedicated caller identification device associated with the first number. Many times, however, a user may wonder if anyone has called the first number while the user is at a remote location, hereinafter referred to as the "second number". While some callers may leave messages, other callers may not leave a message or may hang up before a voice mail service or answering machine answers the call. The caller identification service is valuable in this situation because the user may see who has called regardless of whether the caller left a message.

Currently, a user can only view the caller identification log for a first number by scrolling through the caller identification log via a communication device associated with the first number or dedicated caller identification device coupled to the second number. Thus, there is no way for a user to view the caller identification log of incoming calls for a first number while the user is at a remote location, i.e., a second number.

Another situation may involve a user wanting to know if any calls have been placed from a first number while the user is at a second number. This request may be desirable, in the event children are left unattended in the home, if the user is curious if any calls have been placed from the home landline telephone. Currently, there is not a mechanism to allow a user to determine if any calls have been placed from a first number while the user is at a second number, and furthermore, to determine to which number any outgoing calls were made.

Furthermore, many times a user may want to know, via a mobile device coupled to the second number while the user is driving a vehicle, if any calls have been placed to or from a first number. In this situation, a request to view the caller identification log for the first number should be capable of being easily and quickly entered into the mobile device, i.e., the second number.

Therefore, there is a need for a convenient way for a user to remotely access caller identification logs for a first number. There is also a need for the user to remotely access caller identification information for incoming calls to the first number and outgoing calls from the first number. Furthermore, there is a need for an implementation of this feature in such a way that the user may indicate such a request easily and without a large amount of keystrokes.

SUMMARY OF THE INVENTION

Generally stated, the present invention overcomes the aforementioned drawbacks in the prior art by providing systems and methods for remotely presenting caller identification logs to a requesting user. More specifically, the present invention provides a Call Log service that comprises various systems and methods for presenting caller identification logs for a first directory number to a user at a second directory number upon receipt of a presentation request from a requesting communication device associated with the second directory number, wherein the first directory number is a "subscribing directory number" in that it subscribes to the Call Log service.

The systems and methods of the invention are particularly advantageous in that the invention is preferably implementable in the context of preexisting communication devices. In other words, the invention takes advantage of the features already accessible to legacy devices without the need for modifying the legacy devices. Rather, implementation of the systems and methods of the invention requires, at most, modifications to equipment and/or programming instructions at the network level.

According to an exemplary method of the present invention, a remote processing unit administers the maintenance and delivery of call identification information by detecting an incoming or outgoing call trigger or otherwise receiving an indication of a call to or from the subscribing directory number; retrieving call identification information that identifies the calling or called part, and causing the call identification information for the call to be stored in a remote database that contains at least one call log for the subscribing directory number. The remote processing unit also at least occasionally receives a presentation request from the requesting communication device; and, in response, presents the information in the requested call log for the subscribing directory number by forwarding the call log to the requesting communication device. The indication of the call may be generated in response to an incoming call or an outgoing call. Furthermore, the subscribing directory number and the directory number associated with the requesting communication device may be either a wired or wireless number.

An exemplary system for delivering call identification information associated with the subscribing directory number to a requesting communication device includes a remote database that contains any number of incoming and/or outgoing call logs, wherein each call log is associated with one of any number of subscribing directory numbers, and each call log contains any number of records, each records containing information regarding a call placed to one of the subscribing directory numbers. The exemplary system also includes a processing unit that detects an incoming and outgoing call triggers that indicate that a call has been placed to or from a subscribing directory number. Upon detecting the incoming call trigger, the processing unit retrieves call identification information that identifies the calling party and forwards the call identification information to the remote database for storage in the appropriate call log. The processing unit also functions to receive a presentation request from the requesting communication device and, in response, to retrieve and forward at least a portion of the requested call log from the remote database to the requesting communication device. Therefore, it is an object of the present invention to provide a Call Log service that employs various systems and methods for presenting caller identification logs for a subscribing number to a requesting communication device upon receipt of a presentation request from the requesting communication device.

That the present invention overcomes the drawbacks present in the prior art and accomplishes the objects of the present invention set forth herein will become apparent from the detailed description of the present invention to follow.

BRIEF DESCRIPTION OF THE DRAWINGS

Preferred and alternative embodiments will now be described with reference to the attached figures, wherein like reference numerals indicate similar or identical features or functions, and wherein.

DETAILED DESCRIPTION

Reference will now be made in detail to the present invention, examples of which are illustrated in the accompanying drawings. Wherever possible, the same reference numbers will be used throughout the drawings to refer to the same or like parts. Generally stated, the present invention provides systems and methods for presenting caller identification logs for a subscribing directory number to a remote communication device coupled to a second number. More specifically, the present invention provides a convenient way for a user to remotely access caller identification logs for a subscribing directory number by entering and sending a presentation request from the requesting communication device to a remote database in the network.

Figure 1:
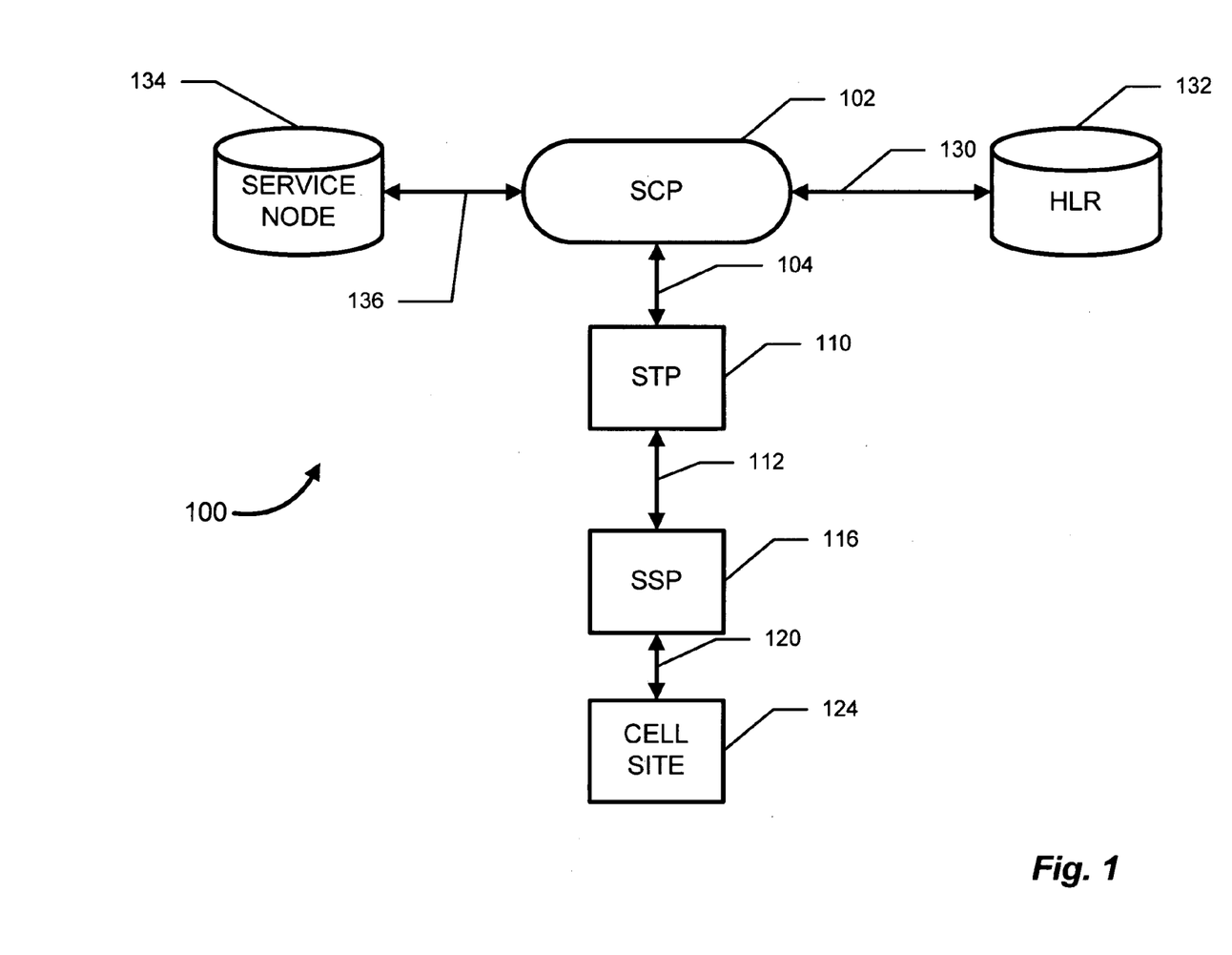
FIG. 1 is an exemplary network environment for the present invention utilized in embodiments wherein the first or second number is associated with a wireless device.

FIG. 1 is an exemplary signaling network environment for the present invention utilized if the first or second number is a wireless number. Signaling network 100 comprises the service control point (SCP) 102. SCP 102 is a programmable network element that includes databases and applications that implement service logic and maintain service-specific data. SCP 102 is coupled to Home Location Register (HLR) 132 via bi-directional communication links 130. One or more signaling transfer points (STPs) 110 are coupled to SCP 102 via bi-directional communication links 104. STPs 110 are also coupled to one or more service switching points (SSPs) 116 via bi-directional communication links 112. In addition to providing access to the network 100 and performing any necessary switching functionality, the SSP 116 detects requests for and provides access to services and establishes communications with the service logic located at the SCP 102. The SCP is also in communication with a Service Node 134 or other Intelligent Peripheral (IP), which provides resources such as customized and concatenated voice announcements, voice recognition, and dual-tone multifrequencies (DTMF) digit collection. The Service Node 134 utilizes a switching matrix to connect and facilitate interaction between users, these resources, and the network. The interface 136 between the SSP 116 and the Service Node 134 is preferably an integrated services digital network (ISDN), primary rate interface (PRI), and/or basic rate interface (BRI), although any suitable connection will suffice.

Figure 2:
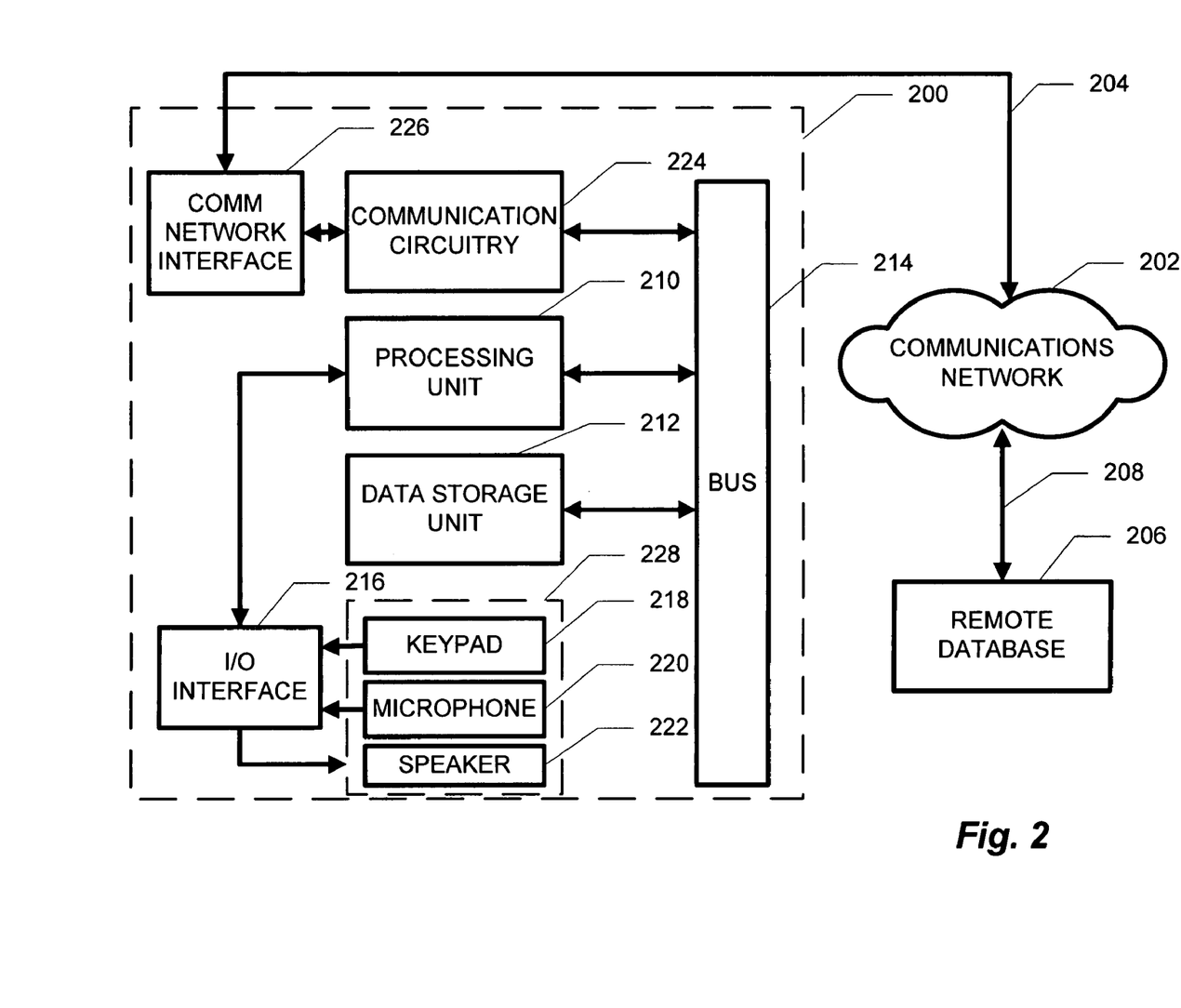
FIG. 2 is a block diagram illustrating an exemplary wireless device according to certain embodiments of the present invention.

FIG. 2 is a block diagram representation illustrating an exemplary wireless communication device 200 in accordance with the present invention. The elements of communication device 200 may be found in either or both the requesting communication device or the communication device that is associated with the subscribing directory number. The communication device 200 places and receives calls with communications network 202, in addition to any other communications, via a bi-directional communications link 204. In addition communication device 200 may interact with remote database 206 through communications network 202. Remote database 206 is coupled to communications network 202 via a bi-directional communications link 208.

Communication device 200 may be any device capable of receiving and transmitting data. This communication device 200 may be either a wireless device, such as a cellular telephone, or a wired device. Communication device 200 contains a processing unit 210 that is communicatively coupled to the other components of the communication device via a bus 214. Additionally, communication device 200 may be communicatively coupled to a client device (not shown), such as a personal data assistant, or may even reside within a client device.

Communication device 200 includes an I/O interface 216, which may reside on the same microprocessing chip as the processing unit 210. However, I/O interface 216 may also reside on an external unit. I/O interface 216 connects the processing unit 210 to a user interface 228. In the case of a wireless device such as a cellular telephone, user interface 228 comprises keypad input 218, microphone input 220, and speaker output 222. The I/O interface 216 may include an analog-to-digital converter for converting an analog microphone signal to a digital signal for use by the processing unit 210. I/O interface 216 may also include a digital-to-analog converter to convert digital information from the processing unit 210 to the speaker 222, such as voice data.

Figure 3:
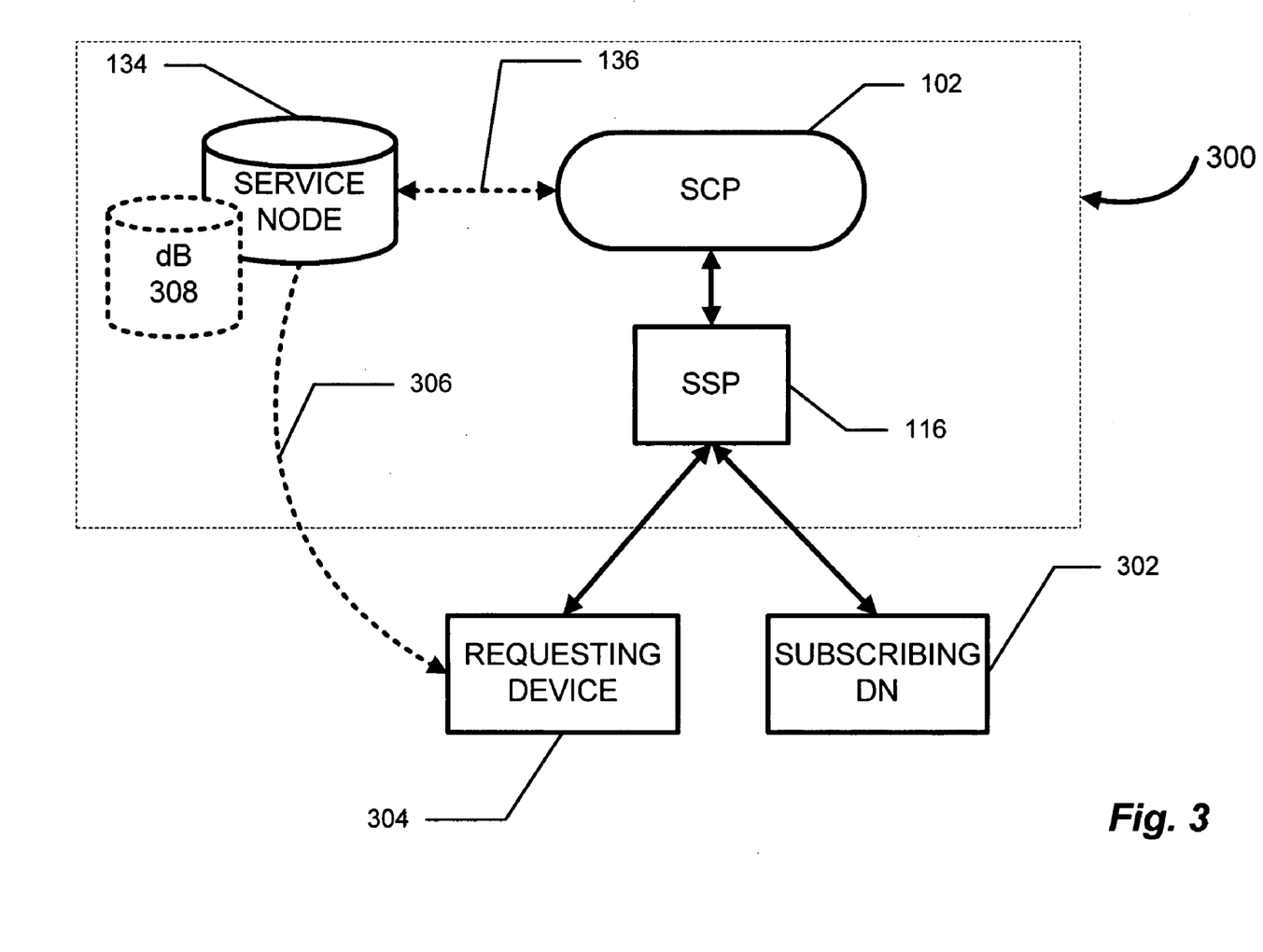
FIG. 3 is a block diagram illustrating the interaction of the functional elements of certain embodiments of the present invention.

Communication device 200 comprises a data storage unit 212, which is discussed in greater detail in FIG. 3. Data storage unit 212 may comprise any type of memory, including but not limited to RAM, EPROM, or EEPROM memory, and may store either volatile or non-volatile memory. In accordance with the present invention, the data storage unit 212 for a communication device 200 coupled to the subscribing directory number may comprise a database for storing caller identification information for incoming calls and/or outgoing calls. The processing unit 210 and the data storage unit 212 may communicate via a system bus 214. Alternatively, the processing unit 210 and the data storage unit 212 may be included on the same microprocessing chip.

The processing unit 210 transmits and receives digital signals that are to be communicated outside the communication device 200 via the communication circuitry 224, which is coupled to a communication network interface 226. If communication device 200 is a typical wireless device, the communication network interface 226 is an antenna, which communicates signals through airwaves to telecommunications network 202 via a bi-directional communication link 204. The bi-directional communications link 204 is established when a call is placed to or from the communication device 200. Alternatively, if the communication device 200 is a wired device, the communication circuitry 224 is coupled to a communications network interface 226 that communicates signals via a wired communication link 204 to communications network 202.

Communications network 202 includes various components to enable communication between two or more communication devices. These components include, but are not limited to, wired connections, wireless connections, switches, and other devices for establishing communication in the network.

FIG. 3 is a block diagram illustrating the interaction of the functional elements of certain embodiments of the present invention. As mentioned above, one aspect of the various embodiments of the invention is a system 300 for delivering call identification information associated with a subscribing directory number to a requesting communication device. The subscribing directory number 302 is a directory number that has been provisioned to have access to the Call Log service implemented by the systems and methods of the present invention. In other words, the subscribing directory number has been identified by its service provider as a subscriber to the service that enables a requesting communication device to access associated call identification information, preferably after the requesting communication device has been properly authenticated. Subscribing directory numbers 302 are preferably identified in the SCP 102 by provisioning the subscribing directory number with the Call Log service. The SCP 102 is prompted to implement the service logic associated with the Call Log service, in response to receiving certain triggers. The triggers are provisioned on the line associated with the subscribing directory number 302, generally via communication between a provisioning system and the SSP 116. The mechanism of operation of the various triggers will be described in more detail below.

The subscribing directory number 302 may be associated with a subscribing communication device, such as a wireless telephone, a PDA, or any other device capable of placing or receiving voice or data calls. The subscribing directory number 302 may be a conventional telephone number according to a system such as the North American Numbering Plan (NANP) consisting of an area code, an exchange, and a subscriber code. Alternately, the subscribing directory number 302 may be any identifier suitable for directing calls to a specific individual or communications device. Likewise, the requesting communication device 304 is uniquely associated with a directory number or similar identifier.

According to an exemplary embodiment, the system 300 for delivering call information associated with a subscribing directory number 302 to a requesting communication device 304 includes a database 308 that is maintained at the network level, and is therefore, remote with respect to both the subscribing and the requesting communication devices 302 and 304. Maintaining the remote database at the network level advantageously enables implementation of the invention with legacy communication devices without modification thereof. This remote database 308 is preferably situated within a Service Node 134, although any suitable network level data storage means can be utilized, including but not limited to an SCP 102, HLR 132, data server, or standalone computer.

The remote database 308 contains records that are configured according to the tenets of any suitable relational database system. The records in the remote database 308 are related, associated, and/or populated to represent call logs that contain information regarding incoming and/or outgoing calls placed to and/or from the subscribing directory number 302. For instance, each record may represent an entry in a call log that is associated with a particular subscribing directory number 302. The call log for the subscribing directory number 302 is requested by querying the remote database 308 for all records that are associated with the subscribing directory number 302. The records requested can be further reduced by narrowing the request to retrieve only outgoing calls (i.e., an outgoing call log) or incoming calls (i.e., an incoming call log).

The remote database 308 is accessed for data storage as a result of a trigger being encountered, typically at a trigger detection point (TDP), trigger check point (TCP), or event detection point (EDP) located at any of various points in call (PICs) in the course of call processing. The trigger is preferably line-based or group-based, although office-based triggers may also be utilized. The trigger suspends the course of ordinary switching system call processing and prompts the implementation of the systems and methods of the present invention. When a call is placed to the subscribing directory number 302, for instance, a terminating attempt trigger (TAT) is detected at the SSP 116. The TAT indicates that the directory number has just received a call. The SSP 116 forwards a Transaction Capability Application Part (TCAP) or similar query to the SCP 102, including the subscribing directory number 302 and the trigger type. In turn, the SCP 102 references the subscribing directory number 302 in its service database and determines that the directory number called is a subscribing directory number 302. The SCP 102 then executes program instructions that perform the appropriate action as prescribed by the type of trigger received from the SSP 116. Continuing with the incoming call example, in response to receiving the TAT, the SCP 102 determines that the appropriate response to detecting an incoming call to a subscribing directory number 302 is to store the call identification information associated with the calling party in the remote database 308. Therefore, the SCP 102 instigates storage of the call identification information associated with the calling party in the remote database 308. The SCP 102 preferably transmits the call identification information to the Service Node 134 over a communications link 136 using a suitable protocol, such as TCP/IP.

Upon receiving the call identification information, the Service Node 134 stores the call identification information in the remote database 308 in one or more records associated with the subscribing directory number 302. The remote database 308 preferably selectively purges or overwrites records when the call identification information has been retrieved, after a certain period of time has elapsed, or when—for a given subscribing directory number 302, a maximum number of records has been exceeded. Alternatively, the remote database 308 may store as many records for each subscribing directory number as its physical memory capacity permits.

A similar process adds data to an outgoing call log when a call is placed from the subscribing directory number 302. In this scenario, an Off Hook Delayed (OHD) trigger is provisioned on the line associated with the subscribing directory number 302. Then, whenever a subscribing directory number dials a call, the SSP 116 detects the OHD trigger after the digits of the called directory number 302 are dialed. The SSP 116 forwards the trigger type and the called directory number to the SCP 102. The SCP 102 determines that the appropriate response to detecting an outgoing call to a subscribing directory number 302 is to store the call identification information associated with the called party in the remote database 308. Accordingly, the SCP 102 forwards that data to the Service Node 134 for storage in the remote database 308

The remote database 308 is accessed for data retrieval as a result of receiving a presentation request from a requesting communication device 304. The presentation request includes at least some of the following information: information identifying the requesting communication device, information identifying the subscribing directory number for which data is requested, and information identifying the type of data requested (e.g., narrowing the request to include specific information only, such as incoming call logs, outgoing call logs, unretrieved records, calls marked as urgent by the caller, or calls associated with voicemail messages). The presentation request can be communicated to the network via any known or yet to be developed communications protocol. For instance, the presentation request can be transmitted to the SSP 116 as a feature trigger. The feature trigger is generated by entering a feature code (such as *32) into the keypad or other input/output interface 216 of the requesting communication device 304. If the requesting communication device is a cellular telephone, the feature code may be followed by pressing SEND to initiate call processing. The SSP 116 detects the feature trigger and preferably forwards the feature trigger and directory number associated with the requesting communication device to the SCP 102. The SCP 102 executes program instructions that recognized the feature code as identifying the Call Log service. Preferably, the presentation request is authenticated before any call identification information can be retrieved. The SCP 102 also analyzes the data received from the SSP 116 in order to determine whether the data is sufficient to enable the SCP 102 to provide (or to prompt the Service Node 134 to provide) the requested call identification information.

To provide call identification information, the presentation request generated by the requesting communication device 304 must supply values for at least some of the following parameters: subscribing directory number, requesting communication device identifier, authentication code, and type of call identification information requested. Some or all of the values can be supplied as part of a feature code string. For example, the feature code can directly identify the type of call identification information requested such as by assigning *32 to requests for incoming call logs, and *33 to requests for outgoing call logs. The subscribing directory number and/or the authentication code can be appended to the feature code string, such that dialing *32-555-123-4567-890 identifies a request for the incoming call log associated with subscribing directory number (555)123-4567, and indicates that the requesting communication device can be authenticated with the authentication code 890 (preferably in combination with the requesting communication device identifier, which is, for example the requesting directory number). The requesting communication device identifier can be ascertained via the caller identification capabilities of the SSP 116, and thus, entry thereof is preferably not required.

The SCP 102 determines whether values for all of the required parameters are provided in the feature code string. If not, the SCP 102 sends a message back to the requesting communication device prompting entry of the values. For instance, if *32 is received as a presentation request, the requesting communication device is prompted (via one or more interactive messages) to enter the called directory number and the requesting communication device identifier. The SCP 102 may utilize the resources of the Service Node 134 to generate and transmit the prompts and to receive responses to the prompts, because the Service Node 134 typically contains voice processing hardware and software, such as text-to-speech and voice cards.

As shown in FIG. 3, the Service Node 134 is also an advantageous location for storing call identification information because it is also accessible via common Internet Protocol (IP) mechanisms. Thus, those skilled in the art will readily appreciate that the Service Node 134 can be accessed via the Internet to retrieve call identification information.

As mentioned above, the remote database 308 is maintained at the SCP 102 in an alternative embodiment. Thus, when the incoming call trigger, outgoing call trigger, and/or presentation request is received by the SCP 102, the SCP processes the trigger and stores or retrieves information in a database that is integral to the SCP.

Figure 4:
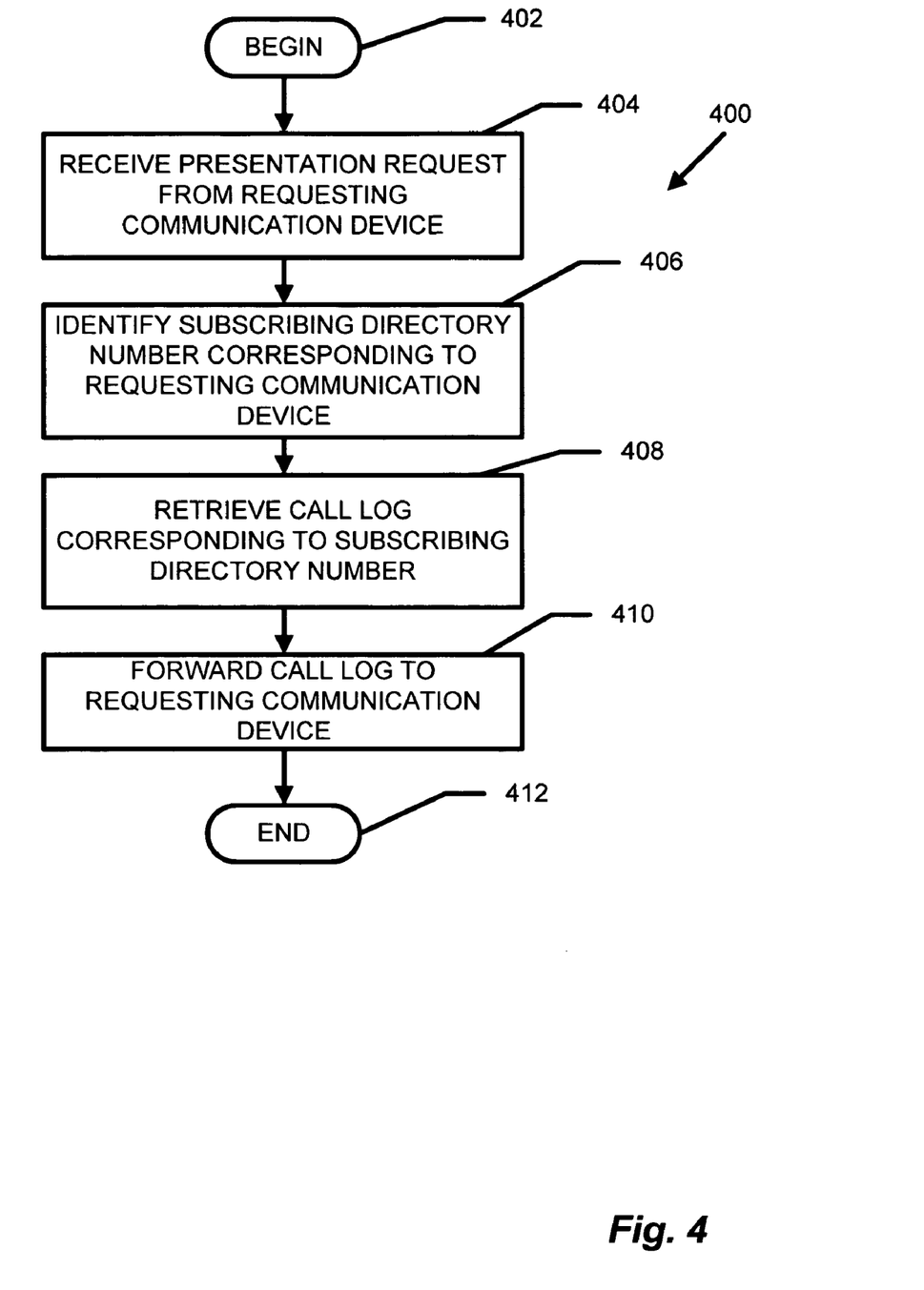
FIG. 4 is a flow diagram illustrating a method of the present invention from the perspective of the system, according to certain embodiments of the present invention.

FIG. 4 is a flow diagram illustrating the method of the present invention from the perspective of the system. Method 400 begins at step 402 and proceeds to the receipt of a presentation request from the requesting communication device at step 404. Preferably, the presentation request in accordance with the present invention is a feature code entered by a user into the requesting communication device. However, the presentation request may be any form of indication capable of being communicated from a communications device to a communications network, including but not limited to, a voice command, the actuation of a dedicated button on the body of a communication device, or entry of another key sequence into the keypad of the requesting communication device.

After the receipt of the presentation request at step 404, the system references the subscribing directory number corresponding to the requesting communication device 406. The subscribing directory number may be retrieved from a database located in any location accessible to the requesting communication device, including but not limited to, HLR 132 in the case of a wireless device. Furthermore, more than one subscribing directory number may be associated with each requesting communication device and more than one requesting communication device can be associated with each subscribing directory number. Alternatively, the subscribing directory number may be received from the requesting communication device as part of the presentation request, as described above.

In this situation, the user may be prompted to enter the subscribing directory number, in addition to any other necessary information such as billing information or a pin number required to access the user's account.

After referencing the subscribing directory number corresponding to the requesting communication device at step 406, the system retrieves the call log corresponding to the subscribing directory number at step 408. The call log may comprise one or more numbers corresponding to outgoing communications from the subscribing directory number or the one or more numbers corresponding to incoming communications to the subscribing directory number. The construction of the call logs for outgoing calls and incoming calls is discussed in greater detail in the explanation of FIGS. 5 and 6.

After retrieving the call log corresponding to the subscribing directory number at step 408, the system forwards the call log to a requesting communication device at step 410 for presentation at the communication device. The method of presentation may vary according to system configuration or user preferences, and includes but is not limited to: converting the call log to a sound file via text-to-speech technology and playing the file over communications network 202 to the requesting communication device; creating a SMS message containing the contents of the call log and communicating the SMS message to the requesting communication device; or creating an email comprising the contents of the call log and communicating the email to the requesting communication device. After presenting the call log to the requesting communication device at step 410, method 400 concludes at step 412.

The call log received by the requesting communication device may be interactive. That is, the requesting communication device may select an entry, thereby generating a query that is returned to the SCP for call processing. Each entry in the call log may be assigned a unique identifier that is referenced when that entry is selected by the requesting communication device. The entry identifier is referenced by the SCP, which initiates a call processing process which connects the requesting communication device to the called number or to the calling number. In this manner, the requesting communication device can not only review calls placed to or from the subscribing directory number, but can also return or redial those calls. From the perspective of the requesting communication device, this interaction may take place through any I/O interface available, including but not limited to voice response via microphone 220 or the device keypad 208.

Figure 5:
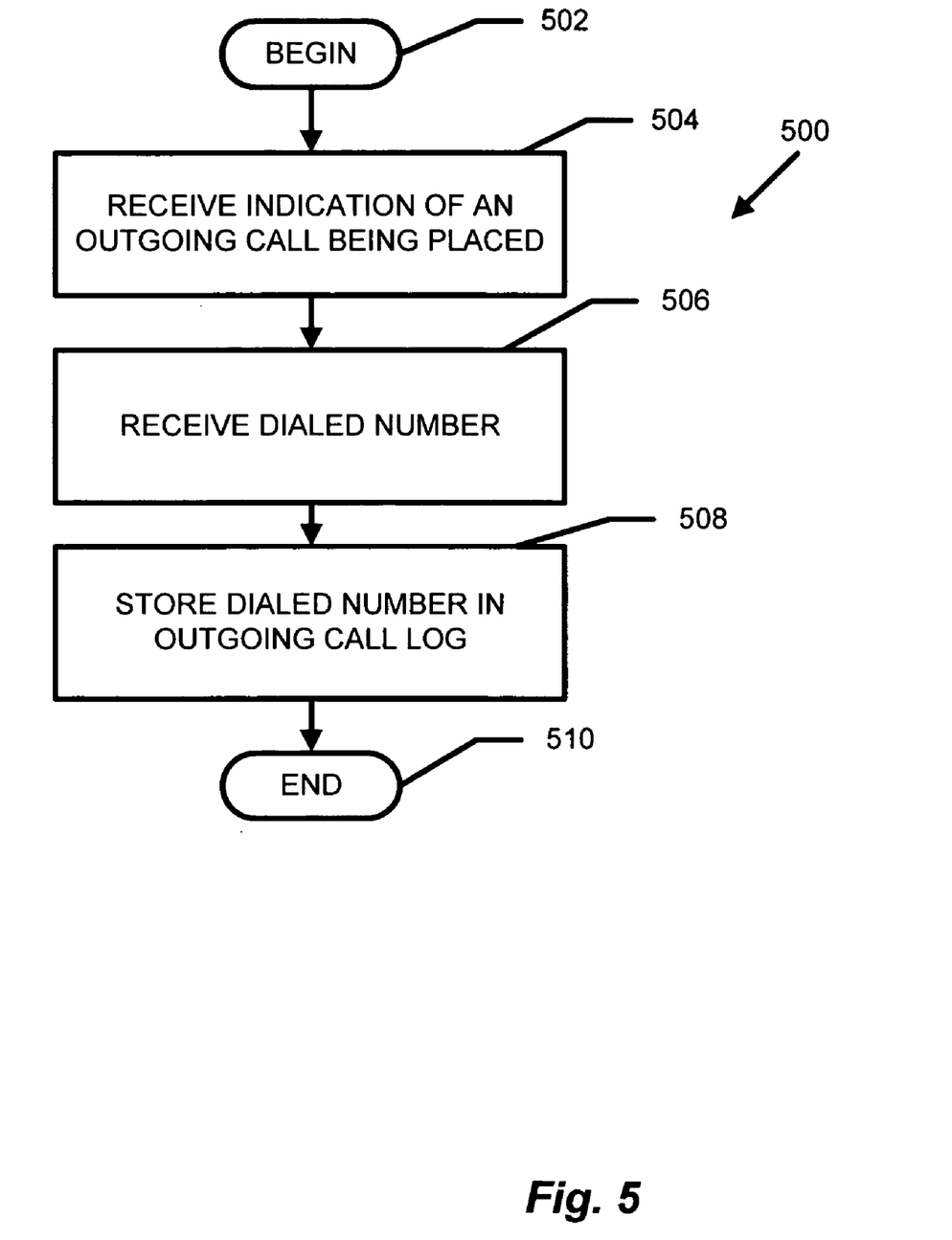
FIG. 5 is a flow diagram illustrating a method of constructing the caller identification log for outgoing calls, according to certain embodiments of the present invention.

FIG. 5 is a flow diagram illustrating the method of constructing the call log for outgoing calls in accordance with the present invention from the perspective of the system. Method 500 begins at step 502 and proceeds to the receipt of an indication that an outgoing call has been placed. This indication may be a trigger that is fired within the network to indicate the receipt of dialed numbers via the keypad 218 of communication device 200, or may be the result any mechanism capable of communicating the initiation of an outgoing call from the subscribing directory number to the system.

At step 506, the system receives the dialed number. The number may be dialed by receiving the series of key presses entered by a user via keypad 218. The number may also be retrieved by the user from memory, such as an address book entry.

At step 508, the dialed number is stored in the outgoing call log for the subscribing directory number. The outgoing call log may be stored within communications network 202, or may be stored in any location accessible to a communication device coupled to the subscribing directory number.

After the dialed number is stored in the outgoing call log for the subscribing directory number, method 500 then concludes at step 510. Method 500 occurs for each outgoing call from the subscribing directory number. Besides the identity of the number dialed for each outgoing call, the outgoing call log may contain any other information such as the time and date the call was placed from the communication device.

Figure 6:
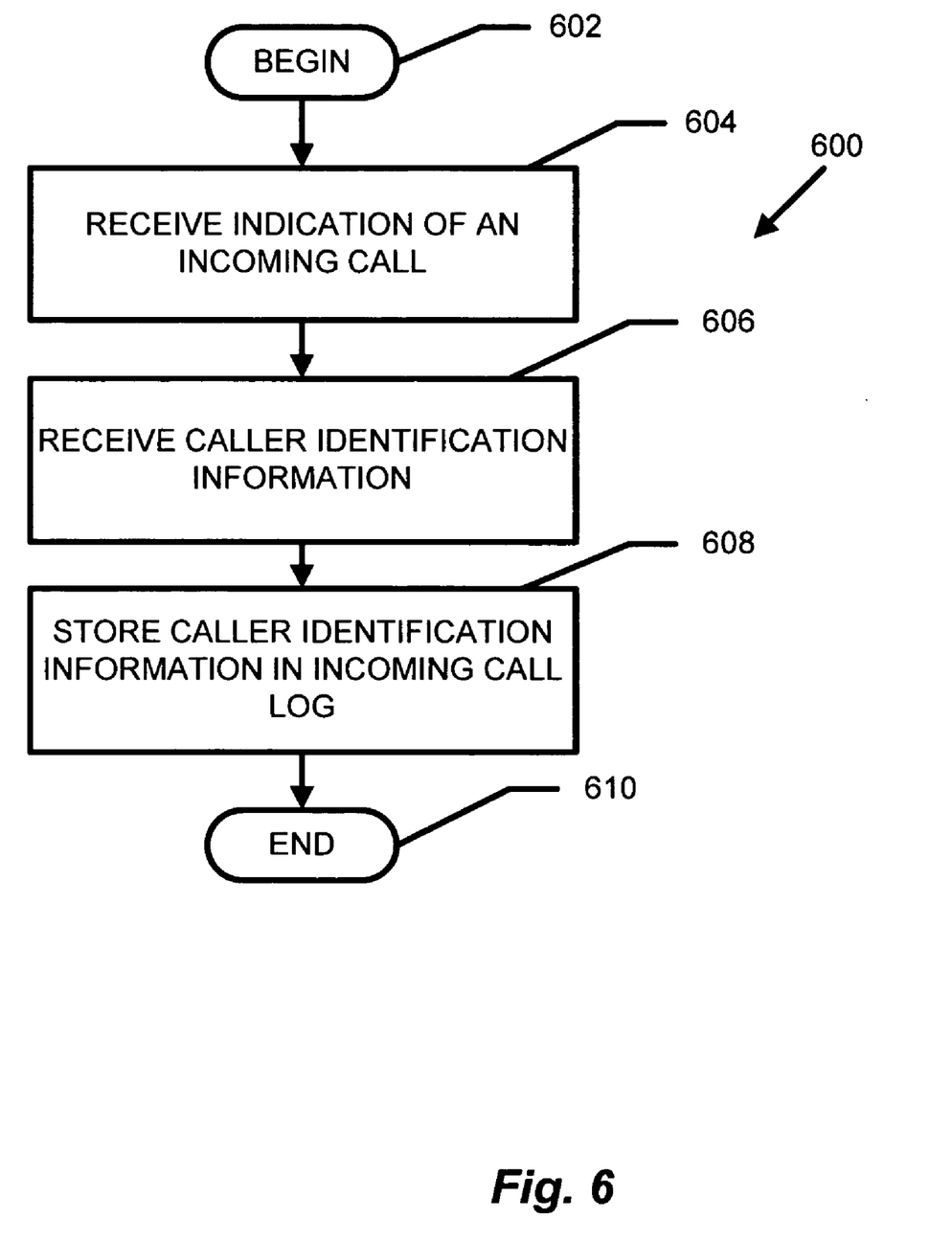
FIG. 6 is a flow diagram illustrating a method of constructing the caller identification log for incoming calls, according to certain embodiments of the present invention.

FIG. 6 is a flow diagram illustrating the method of constructing the call log for incoming calls in accordance with the present invention. Method 600 begins at step 602 and proceeds to the receipt of an incoming call indication at step 604. The receipt of the incoming call indication may be, but is not limited to, a trigger that is fired within the communications network 202.

At step 606, the system receives the caller identification information for the incoming call. Caller identification information for an incoming call is typically communicated from the communications network 202 to a communication device coupled to a telephone number in between the first and second rings generated from the incoming call. The incoming call trigger and Call Log service provisioning of the present invention effectively cause the network to record the typical communication of caller identification information and to store it for later retrieval by a remote requesting communication device. Thus, when this caller identification information is recorded, the caller identification information is stored in the incoming call log for the subscribing directory number at step 608. This incoming call log may be stored within communications network 202, or may be stored in any location accessible to a communication device coupled to the subscribing directory number.

After the caller identification information for the incoming call is stored in the incoming call log for the subscribing directory number, method 600 concludes at step 610. Method 600 occurs for each incoming call to the subscribing directory number. Besides the identity of the number received, the incoming call log may contain any other information, such as the time and date the call was received.

Other embodiments of this invention will be apparent to those skilled in the art from consideration of the specification and practice of the invention disclosed herein. For instance, although described primarily in the context of identification of voice calls, the principles of the systems and methods of the invention are equally applicable to identification of the source of data calls received by the subscribing directory number. Furthermore, although presentation requests are described as being issued and fulfilled over the wireless network, it is contemplated that any device can request and receive call logs over the Internet via the ISDN connection to the Service Node. As another example, it is contemplated that the SCP contain an application that enables the requesting communication device to call back any directory number received as part of a call log. It is intended that the specification and examples be considered as exemplary only, and within the scope and spirit of the invention as indicated in the description and the following claims.

What is claimed is:

1. In an intelligent network (IN), a system for delivering call identification information associated with a subscribing directory number to a requesting communication device, the IN having a plurality of network nodes, the system comprising:

a first one of the plurality of network nodes, comprising a remote database containing a plurality of incoming call logs, wherein:

at least one incoming call log is associated with the subscribing directory number each including call log comprises a plurality of records; and each of the plurality of records comprises information regarding a call placed to the subscribing directory number; and a second one of the plurality of network nodes communicatively associated with the first network node, the second network node being operational to:

detect an incoming call trigger that indicates that a call has been placed to one of the plurality of directory numbers;

upon detecting the incoming call trigger, retrieve call identification information that identifies the calling party, and forward the call identification information to the remote database for storage in the incoming call log associated with the subscribing directory number;

receive a signaling message containing a presentation request from the requesting communication device; and in response to receiving the presentation request from the requesting communication device, retrieve and forward at least a portion of the incoming call log associated with the subscribing directory number from the remote database to the requesting communication device, the at least a portion of the incoming call log consisting of records not previously forwarded to the requesting communication device, the remote database further comprising an outgoing call log having a plurality of records, each record containing information regarding a call originating from the subscribing directory number; and the second network node being further operational to:

detect an outgoing call trigger that indicates that a call has originated from the subscribing, directory number;

upon detecting the outgoing call trigger, retrieve call identification information that identifies the called party, and forward the call identification information to the remote database for storage in the outgoing call log; and retrieve and forward at least a portion of the outgoing call log from the remote database to the requesting communication device in response to receiving a presentation request from the requesting communication device, the at least a portion of the outgoing call log consisting of records not previously forwarded to the requesting communication device.

2. The system of claim 1, wherein the remote database is a Home Location Register (HLR).

3. The system of claim 2, wherein the second network node is a Service Control Point (SCP).

4. The system of claim 1, wherein the remote database is a Service Node (SN) and the second network node is a Service Control Point (SCP).

5. The system of claim 1, wherein the remote database and the second network node are integral to a Service control Point (SCP).

6. The system of claim 1, wherein the second network node is further operational to detect the incoming call trigger and the presentation request via a common-channel signaling protocol.

7. The system of claim 6, wherein the common-channel signaling protocol is Signaling system 7 (SS7).

8. The system of claim 1, wherein the second network node is further operational to forward the at least a portion of the incoming call log using one of the following messaging protocols: text messaging, multimedia messaging, SMS, or MMS.

9. The system of claim 1, wherein the second network node is further operational to forward the at least a portion of the incoming call log as a multimedia message.

10. The system of claim 1, wherein the second network node is further operational to forward the at least a portion of the outgoing call log using one of the following messaging protocols: text messaging, multimedia messaging, SMS, or MMS.

11. The system of claim 1, wherein the second network node is further operational to forward at least a portion of the incoming call log as an SMS message.

12. The system of claim 1, wherein the at least a portion of the incoming call log consists of records associated with voicemail messages.

13. The system of claim 1, wherein the presentation request received from the requesting communication device comprises a feature code string.

14. The system of claim 13, wherein the feature code string comprises a star code followed by the subscribing directory number.

15. A method for delivering call identification associated with a subscribing directory number to a requesting communication device the method being implemented in an intelligent network (IN) having a plurality of network nodes, comprising:

at a first one of the plurality of network nodes, detecting an incoming call trigger that indicates that a cull has been placed to the subscribing directory number;

upon detecting the incoming call trigger, retrieving call identification information that identifies the calling party, and forwarding the call identification information to a second one of the plurality of network nodes that includes a remote database for storage in one of a plurality of records in an incoming call log that is associated with the subscribing directory number;

receiving a signaling message containing a presentation request from the requesting communication device;

in response to receiving the presentation request from the requesting communication device, retrieving and forwarding at least a portion of the incoming call log from the remote database to the requesting communication device, the at least a portion of the incoming call log consisting of records not previously forwarded to the requesting communication device at the first one of the plurality of network nodes, detecting an outgoing call trigger that indicates that a call has been placed from the subscribing directory number;

upon detecting the outgoing call trigger, retrieving call identification information that identifies the called party, and forwarding the call identification information to the second one of the plurality of network nodes for storage in one of a plurality of records of an outgoing call log of the remote database, the outgoing call log being associated with the subscribing directory number;

receiving a second signaling message containing a second presentation request from the requesting communication device; and in response to receiving the second presentation request from the requesting communication device, retrieving and forwarding at least a portion of the outgoing call log from the remote database to the requesting communication device, the at least a portion of the outgoing call log consisting of records not previously forwarded to the requesting communication device.

16. The method of claim 15, wherein detecting an incoming call trigger comprises receiving a signal via a common-channel signaling protocol.

17. The system of claim 16, wherein the common-channel signaling protocol is Signaling System 7 (SS7).

18. The method of claim 15, wherein receiving a presentation request comprises receiving a signal via a wireless messaging protocol.

19. The method of claim 18, wherein the wireless signaling protocol is Signaling System 7 (SS7).

20. The method of claim 15, wherein receiving a presentation request comprises authenticating the requesting communication device.

* * * * *